(12) United States Patent
Jantunen et al.

(10) Patent No.: US 8,290,029 B2
(45) Date of Patent: Oct. 16, 2012

(54) RADIO UNIT RECONFIGURATION

(75) Inventors: Joni Jorma Marius Jantunen, Helsinki (FI); Jaakko Valtteri Varteva, Veikkola (FI); Jari-Jukka Harald Kaaja, Jarvenpaa (FI); Risto Heikki Sakari Kaunisto, Espoo (FI); Bertrand Gomez, Meylan (FR); Michael Pelissier, Grenoble (FR)

(73) Assignee: Nokia Corporation, Espoo (FI)

( * ) Notice: Subject to any disclaimer, the term of this patent is extended or adjusted under 35 U.S.C. 154(b) by 94 days.

(21) Appl. No.: 13/072,386

(22) Filed: Mar. 25, 2011

(65) Prior Publication Data

US 2011/0235690 A1  Sep. 29, 2011

(30) Foreign Application Priority Data

Mar. 26, 2010  (EP) .................................... 10157973

(51) Int. Cl.
*H04B 1/38* (2006.01)
*H04L 5/16* (2006.01)

(52) U.S. Cl. .......... 375/219; 455/336; 331/185
(58) Field of Classification Search ................... 375/219, 375/316; 455/336; 331/186
See application file for complete search history.

(56) References Cited

U.S. PATENT DOCUMENTS

2004/0198288 A1* 10/2004 Sadowski ................ 455/259
2005/0069051 A1*  3/2005 Lourens ................. 375/316

* cited by examiner

*Primary Examiner* — Curtis Odom
(74) *Attorney, Agent, or Firm* — Nokia Inc.

(57) ABSTRACT

A super-regenerative transceiver that has an antenna interface for an antenna is self-tuned with a self-tuning unit configured. The self-tuning unit makes the transceiver to repeatedly perform a self-tuning cycle until the amplitude meets a predetermined detection condition or a predetermined criterion is met. The self-tuning cycle involves the following: transmitting to the antenna a probe signal with one or more pulses; receiving from the antenna a ringing detection signal; determining if the ringing detection signal reflects tails of the probe signal with amplitude meeting a predetermined detection condition; and adjusting of the tuning of the super-regenerative transceiver if the amplitude does not meet the predetermined detection condition.

19 Claims, 4 Drawing Sheets

RADIO UNIT RECONFIGURATION

RELATED APPLICATION

This application claims the benefit of European Patent Application No. 10157973.8 filed on Mar. 26, 2010, the contents of which are expressly incorporated by reference herein.

TECHNICAL FIELD

The present invention generally relates to radio unit tuning. The invention relates particularly, though not exclusively, to tuning of super-regenerative transceiver radio units.

BACKGROUND ART

All radio units have a receiver and/or transmitter circuitry and an antenna. The antenna is needed for conversion between radio signals and electric radio frequency signals. It is known that the antenna should be sensitive in the frequency range or ranges in which the antenna is designed to operate. There are various different antenna designs in which a local or global resonance maximum appears at desired sensitive frequency ranges.

Radio units may be used in various different applications. In some cases, the radio unit may be particularly designed as an entity so that all the circuitry in the immediate proximity of the antenna is designed to enable faultless operation of the antenna. For example, a television or radar antenna is typically spaced far apart from other objects. In some applications, a generic radio unit is squeezed into portable device. The antenna may be surrounded with circuitries that alter the operation of the antenna. For instance, there may be numerous different antennas in a cellular phone for wireless local area network, for Bluetooth, for near field communications and for different cellular and satellite communications. Hence, each radio unit may require particular customization to ensure desired operation in its operation environment. For instance, the antenna placement, antenna characteristics and/or matching of the antenna may be varied on production line for each portable radio device. Moreover, the radio units may also have some variance even if built with common specification so that in some cases, cascading tuning operations may be needed to ensure desired operation of portable radio devices.

SUMMARY

According to a first example aspect of the invention there is provided an apparatus comprising a super-regenerative transceiver; an antenna interface configured to connect the super-regenerative transceiver with an antenna; a self-tuning unit configured to cause a self-tuning cycle to: transmit to the antenna a probe signal with one or more pulses; receive from the antenna a ringing detection signal; determine if the ringing detection signal reflects tails of the probe signal with amplitude meeting a predetermined detection condition; causing adjusting of the tuning of the super-regenerative transceiver if the amplitude does not meet the predetermined detection condition; and repeat the self-tuning cycle until the amplitude meets the predetermined detection condition or a predetermined criterion is met.

In an example embodiment, the predetermined criterion may be selected from a group consisting of: having performed a predetermined maximum number of self-tuning cycles; having spent a predetermined maximum time to perform self-tuning cycles; and having estimated that further self-tuning cycles would not likely result in the amplitude meeting the predetermined detection condition.

Further, the detection condition may refer to not exceeding a predetermined threshold amplitude. Alternatively, the detection condition may refer to an amplitude that meets a relative condition. The relative condition may be that the amplitude is the smallest measured amplitude or differs less than by a given proportion from the smallest measured amplitude. The amplitude may be calculated by averaging a number of measurements.

The self-tuning unit may be configured to the self-tuning cycles with two or more different time offsets between transmission and reception periods configured by respective quench signals. The self-tuning unit may be configured to rank the apparatus to one of two or more different categories depending on smallest time offset between transmission and reception periods where said amplitude meets the predetermined detection condition. The categories may be indicative of maximum responsiveness or data transfer rate of the apparatus.

The adjusting of the tuning of the super-regenerative transceiver may comprise adapting impedance matching between super-regenerative transceiver and the antenna. The adjusting of the tuning of the super-regenerative transceiver may comprise fine-tuning of center frequency of the super-regenerative transceiver. The adjusting of the tuning of the super-regenerative transceiver may comprise adjusting the tuning of the antenna. The adjusting of the tuning of the antenna may comprise adjusting the antenna configuration and/or the bandwidth of the antenna. The antenna may comprise a controllable element such as one or more switches configured to alter the characteristics of the antenna under control of the self-tuning unit. The controllable element may be configured to enable beam control of the antenna. The adjusting of the tuning of the super-regenerative transceiver may comprise adjusting of the amplitude of transmission quench signal currents. The adjusting of the tuning of the super-regenerative transceiver may comprise adjusting the shape of transmission quench signal waveforms.

The apparatus may be configured to transmit of a probe signal and the receiving of the ringing detection signal such that the transmission and reception of pulses occurs substantially simultaneously or with a controlled delay. The controlled delay may be caused by producing time-offset transmission and reception quench signals in the super-regenerative transceiver. The apparatus may comprise the antenna connected with the antenna interface.

The self-tuning unit may be configured to perform self-tuning when the apparatus starts to operate. The self-tuning unit may be configured to perform self-tuning responsive to receiving a self-tuning command over a radio connection from an external device. The radio connection may refer to a radio connection formed by a transceiver other than the super-regenerative transceiver.

The self-tuning unit may be configured to perform self-tuning responsive to identifying a predetermined level of communication errors on operating the super-regenerative transceiver.

The self-tuning unit may be configured to store self-tuning related information in non-volatile memory. The apparatus may be further configured to provide access to the stored self-tuning related information over a remote access link. The remote access link may comprise a radio link provided by the super-regenerative transceiver. The remote link may comprise a radio link provided by another radio transceiver such as a narrow-band link. The apparatus may further comprise a connector for wired providing wired access to the stored self-tuning related information.

According to a second example aspect there is provided a method in a super-regenerative transceiver that comprises an antenna interface configured to connect the super-regenerative transceiver with an antenna, the method comprises: performing in the super-regenerative transceiver a self-tuning cycle comprising: transmitting to the antenna a probe signal with one or more pulses;

receiving from the antenna a ringing detection signal; determining if the ringing detection signal reflects tails of the probe signal with amplitude meeting a predetermined detection condition;

causing adjusting of the tuning of the super-regenerative transceiver if the amplitude does not meet the predetermined detection condition; and repeating the self-tuning cycle until the amplitude meets the predetermined detection condition or a predetermined criterion is met.

According to a third example aspect there is provided a computer program configured to control a super-regenerative transceiver that comprises an antenna interface configured to connect the super-regenerative transceiver with an antenna, the computer program comprising computer executable program code configured to cause the super-regenerative transceiver, when executed, to: perform in the super-regenerative transceiver a self-tuning cycle comprising: transmitting to the antenna a probe signal with one or more pulses; receiving from the antenna a ringing detection signal; determining if the ringing detection signal reflects tails of the probe signal with amplitude meeting a predetermined detection condition; and causing adjusting of the tuning of the super-regenerative transceiver if the amplitude does not meet the predetermined detection condition; and repeat the self-tuning cycle until the amplitude meets the predetermined detection condition or a predetermined criterion is met.

According to a fourth example aspect of the invention there is provided an apparatus comprising: a super-regenerative transceiver; an antenna interface means for connecting the super-regenerative transceiver with an antenna; a self-tuning means for causing a self-tuning cycle to: transmit to the antenna a probe signal with one or more pulses; receive from the antenna a ringing detection signal; determine if the ringing detection signal reflects tails of the probe signal with amplitude meeting a predetermined detection condition; cause adjusting of the tuning of the super-regenerative transceiver if the amplitude does not meet the predetermined detection condition; and repeat the self-tuning cycle until the amplitude meets the predetermined detection condition or a predetermined criterion is met.

The computer program may be stored on a computer-readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
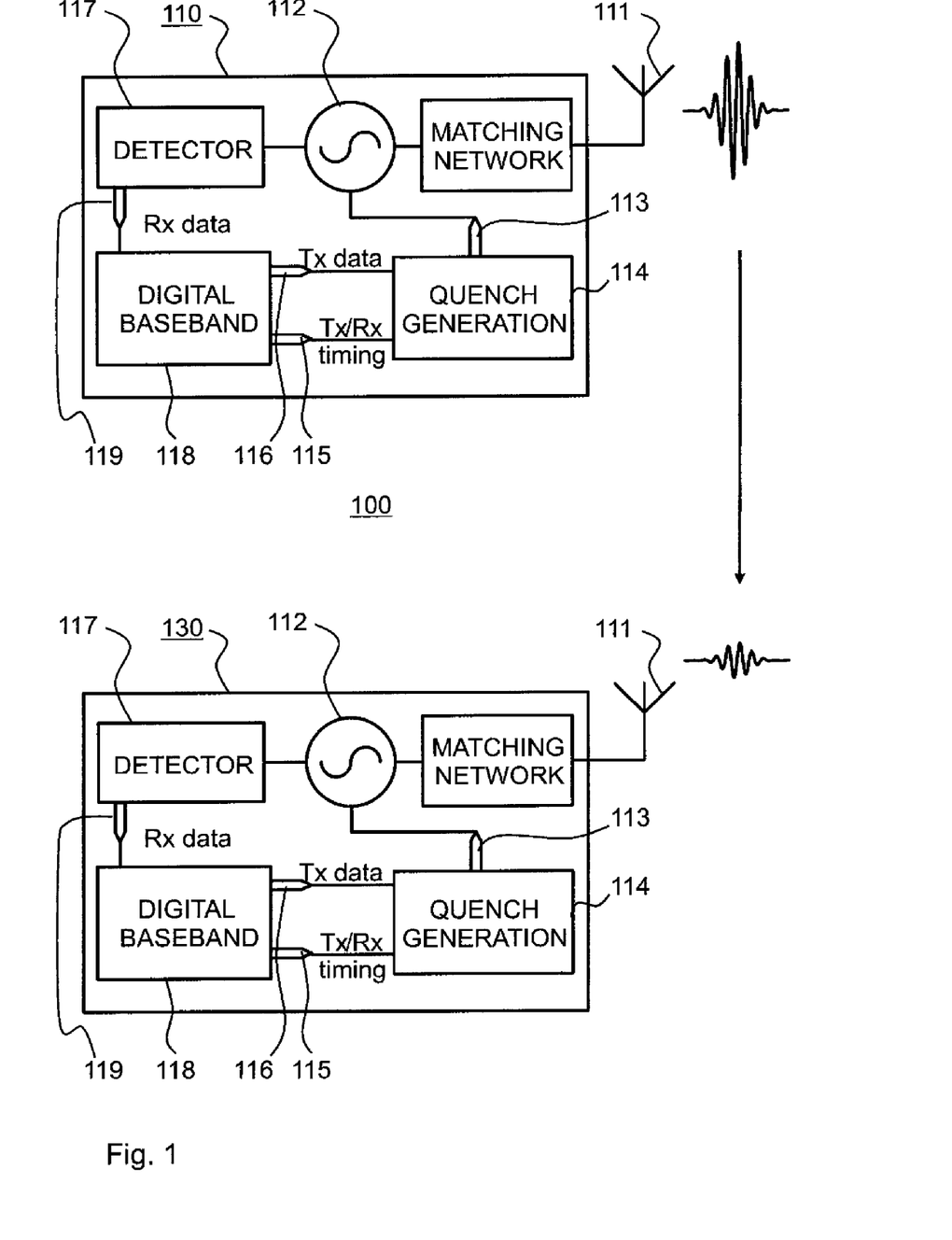
FIG. 1 shows a schematic picture of a system according to a first embodiment of the invention.

FIG. 1 shows a schematic drawing of a system 100 according to a first embodiment of the invention. This system is disclosed as one example framework for explaining some particular example embodiments of the invention. The system comprises a transmitter unit 110. In this example embodiment, it is assumed that the transmitter unit 110 is an impulse ultra-wide band (I-UWB) transmitter unit 110. It may be further assumed to enable description of particular example embodiments that the transmitter unit 110 is a transceiver i.e. also capable of receiving information. The transmitter unit 110 comprises an antenna 111 functionally coupled with an antenna interface. The transmitter unit 110 further comprises an oscillator 112 connected to the antenna 111, the oscillator comprising a pulse control input 113 connected to a quench signal source 114. The quench signal source 114 comprises a transmission/reception activation signal input 115 and a transmission data input 116. The system 100 further comprises in a series with the oscillator and the matching network a radio frequency (RF) detector 117 and a baseband part 118 with an input 119 for received and detected data. The RF detector 117 is connected to the oscillator 112. The RF detector 117 may comprise a 1-bit or multi-bit analog to digital converter (ADC, not shown). A multi-bit ADC is used in some example embodiments of the invention such that detection level is adjusted for fine-tuning the operation of the transmitter unit 110.

The baseband part 118 is configured to provide quench signal timing to the quench generation or quench signal source 114. The baseband part 118 may be a digital baseband part. In case of reception periods, the baseband part 118 causes the quench signal source 114 to produce a quench signal shaped for a reception period. Correspondingly, in case of transmission periods, the baseband part 118 causes the quench signal source to produce a quench signal shaped for a transmission period. The quench signals used for transmission and receiving periods may have differing shapes and amplitudes or currents. The shape of each quench signal may be determined with predetermined registers in a quench generation block. Hence, the Tx/Rx timing signal may also provide further information on top of mere timing of quench signals.

In a second example embodiment of the invention, the Tx/Rx timing signal only triggers generation of a quench signal by the quench signal source 114 without distinguishing between transmission and receiving periods. The second example embodiment may be used in connection with the first example embodiment.

Figure 4:
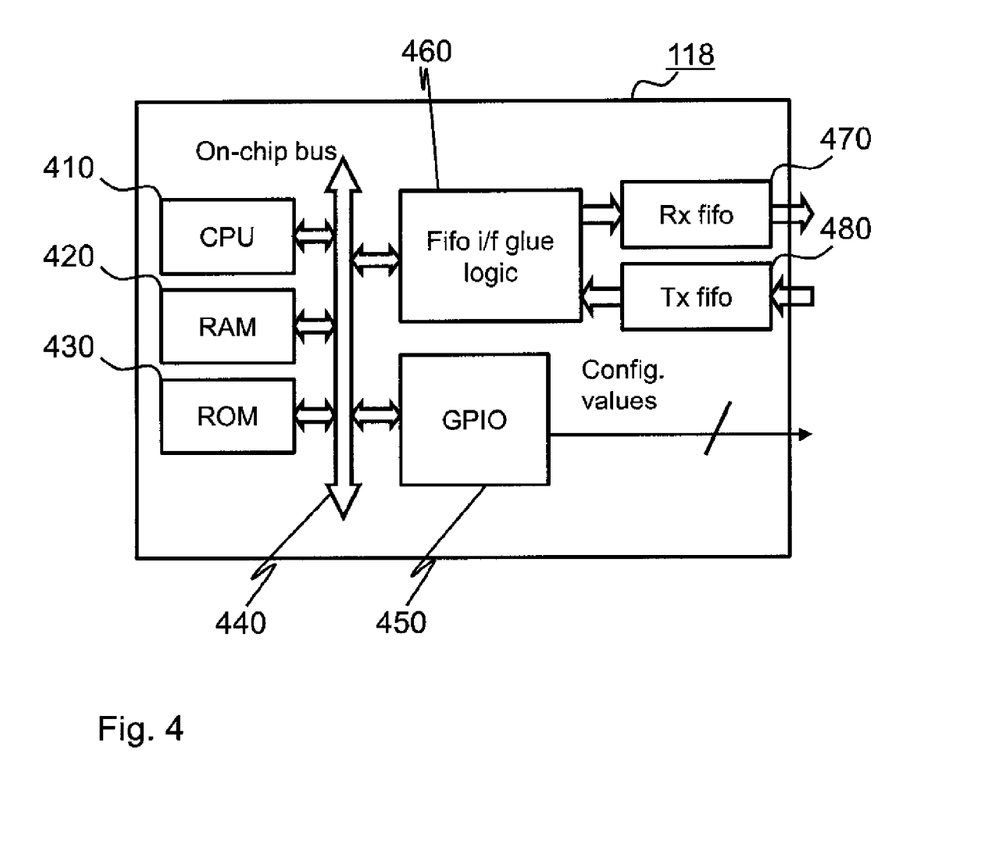
FIG. 4 shows a block diagram of a baseband part suited for use in the system of FIG. 1 according to an example embodiment of the invention.

A structure of the baseband part 118 according to a third example embodiment of the invention is illustrated in FIG. 4. FIG. 4 shows a processor 410 such as a central processing unit, a work memory 420 such as a random access memory (rain) and a non-volatile memory 430 such as a read-only memory or a flash ram. The non-volatile memory 430 is configured in this example embodiment to store tuning settings and a computer program that comprises computer executable program code for being executed by the processor 410 in-place in the non-volatile memory and/or in the random access memory 420. The baseband part 118 in FIG. 4 further comprises a data bus 440 such as an on-chip bus and a data exchange interface that comprises a general purpose input/output (GPIO) 450 and a communication input/output block 460. The communication input/output block 460 in this example embodiment includes adaptation logic that is needed to connect receiving and transmitting fifo blocks 470 and 480, respectively, to the data bus 440. The third example embodiment may be used in connection with any one or more of the first and second example embodiment.

In a fourth example embodiment of the invention, the system 100 is constructed to form a super-regenerative detector in which the oscillator 112 is automatically switched between an oscillating and a non-oscillating condition according to the quench signal received from the quench signal source 114. When a quench signal starts the oscillator 112, oscillation builds up in the detector during a positive excursion or maximum of each cycle of the quench and extinguishes during a negative excursion or minimum voltage in the quench signal. This example embodiment may be used in connection with any one or more of the first to third example embodiment.

In a fifth example embodiment of the invention, no other signal is applied to the oscillator 112 so that oscillation builds up during each positive portion of a quench voltage cycle starting from an initial amplitude determined by the thermal noise present at the input of the oscillator and reaches a final value corresponding to the equilibrium value for the oscillator. The oscillation then fades away during the negative or low portion of the quench voltage cycle. Such building of pulses produces pulses of random phase. This example embodiment may be used in connection with any one or more of the first to fourth example embodiment.

The system 100 may be applied in radio frequency identity (RFID) applications. According to a sixth example embodiment of the invention, a receiver device or transponder is electrified by the radio transmission sent by a reader device. It is appreciated that each of the receiver and reader devices may communicate bi-directionally. The terms reader device and receiver device may be used to indicate whether the device or at least the UWB communication is self-powered. This example embodiment may be used in connection with any one or more of the first to fifth example embodiment.

In a sixth example embodiment of the invention, the system 100 comprises a switch to start the oscillator 112 on beginning of the forming of a pulse. This function may be provided by the quench signal source 114 or a dedicated switch may be provided.

The switching of the oscillator 112 may serve multiple purposes. For instance, the switching may be used to reduce power draw of the oscillator by stopping the oscillator when not needed.

The seventh example embodiment may be used in connection with any one or more of the first to sixth example embodiment.

In an eighth example embodiment of the invention, the oscillator 112 is also configured to alternate the frequency of the pulses in a predetermined manner. The alternating may be configured to alternate the frequency of the pulses so as to smooth the spectral density mask of resulting radio signals, while the alternations are yet small enough to enable reception without need to perform corresponding frequency adaptation. The alternating may comprise larger changes so that the alternating in effect causes frequency hopping according to a predetermined frequency hopping scheme. Frequency hopping as such is well-known from different radio communication technologies such as the Bluetooth and frequency hopping may help to further reduce interference with neighboring radio systems. This example embodiment may be used in connection with any one or more of the first to seventh example embodiment.

In a ninth example embodiment of the invention, the phase of pulses is not randomised. This example embodiment may be used in connection with any one or more of the first to fourth example embodiment.

Let us next turn into various example embodiments which relate to self-tuning of a super-regenerative transceiver.

The simple structure of a super-regenerative transceiver based on using single super-regenerative transceiver for both RX and TX directions enables that first an actual Tx pulse is transmitted using a TX quench period and then the Tx quench period is almost immediately followed by an Rx quench period. Based on the peak-amplitude/threshold measurement made during the Rx period, the decisions for parameter tuning can be done in some example embodiments of the invention as will be described with more detail in the following.

Figure 2:
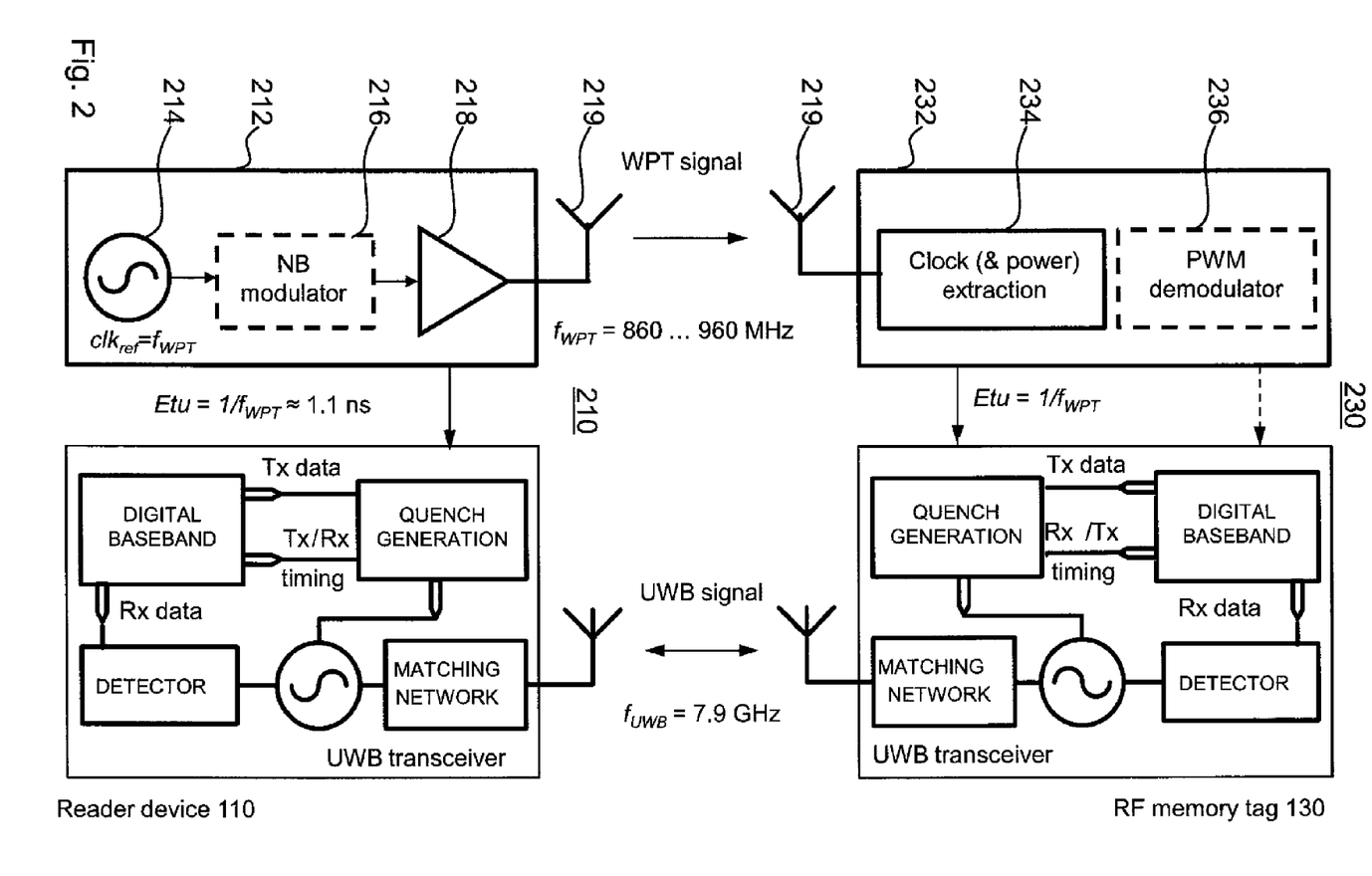
FIG. 2 shows a block diagram of a narrow band powered ultra-wide band communication system according to a tenth example embodiment of the invention.

FIG. 2 shows a block diagram of a narrow band powered ultra-wide band communication system 200 according to a tenth example embodiment of the invention. The tenth example embodiment may be used in connection with any one or more of the first to ninth example embodiment.

The system comprises a power transmitting communication device 210 and a power receiving communication device 230. The power transmitting communication device 210 has a narrow band powering block 212, that comprises an oscillator 214, an optional communication block that is here a narrow band communication block. The narrow band communication block comprises a modulator 216 such as an amplitude shift keying (ASK) modulator, a power amplifier 218 and an antenna 219. The power transmitting communication device 210 further comprises an I-UWB communication block 211 or transceiver that may have a structure similar to the I-UWB transmitter 110 of FIG. 1. The power receiving communication device 230 comprises a corresponding I-UWB transceiver unit. On both power transmitting and receiving sides, the I-UWB transceiver unit is drawn to be powered by the power transmitting or receiving narrow band unit. On the power receiving side, a narrow band communication unit 232 comprises a clock and power extraction block 234 and an optional communication block 236, here drawn as a pulse-width demodulator. The narrow-band communication units 211 and 232 may transfer a self-tuning command from a reader device to a powered device.

It should be appreciated that an I-UWB reader device 110, whether capable of powering other devices or not, may also be operated as a radio powered device. For instance, a cellular phone mounted I-UWB reader device 110 is used in one example embodiment of the invention as a radio powered memory device to share its memory with (user authorised) equipment, without power draw on the battery of the cellular phone.

FIG. 2 also further exemplifies transmission of on-off keying modulated pulse stream from one super-regenerative transmitter to a super-regenerative receiver sharing common super-regenerative transmitter/receiver architecture.

In an eleventh example embodiment of the invention, the UWB-transceivers of FIG. 2 correspond to those drawn in FIG. 1 for transmitter and receiver end, respectively (even though both may be capable of transmitting and receiving of information over UWB links). Hence, the structure and operation of these blocks requires no further description here: please refer to description of FIG. 1 for these parts. This example embodiment may be used in connection with any one or more of the first to tenth example embodiment.

In a twelfth example embodiment of the invention, the wireless power transfer link (WPT link) is also used to transfer short commands at a data-rate such as hundreds of kilobits a second, for example to control the UWB link and selection of tags. In such a dual-band system, a dedicated calibration command can be transferred over the wireless power transfer link. In that case, for example the calibration of UWB transmitter (and receiver) in the tag can be initiated by sending a calibration command over the WPT link. In response, the super-regenerative transceiver may start to transmit a calibration pattern to be measured by testing equipment. This example embodiment may be used in connection with any one or more of the first to eleventh example embodiment.

In a thirteenth example embodiment of the invention, the reader device of FIG. 2 is replaced by wireless testing equipment in production testing. The calibration results may be further sent to powered super-regenerative transceiver device over the WPT link or over the actual communication link (impulse UWB link) to set the calibration parameters and to compare them against the values measured power receiving super-regenerative transceiver itself. This example embodiment may be used in connection with any one or more of the first to twelfth example embodiment.

Figure 3:
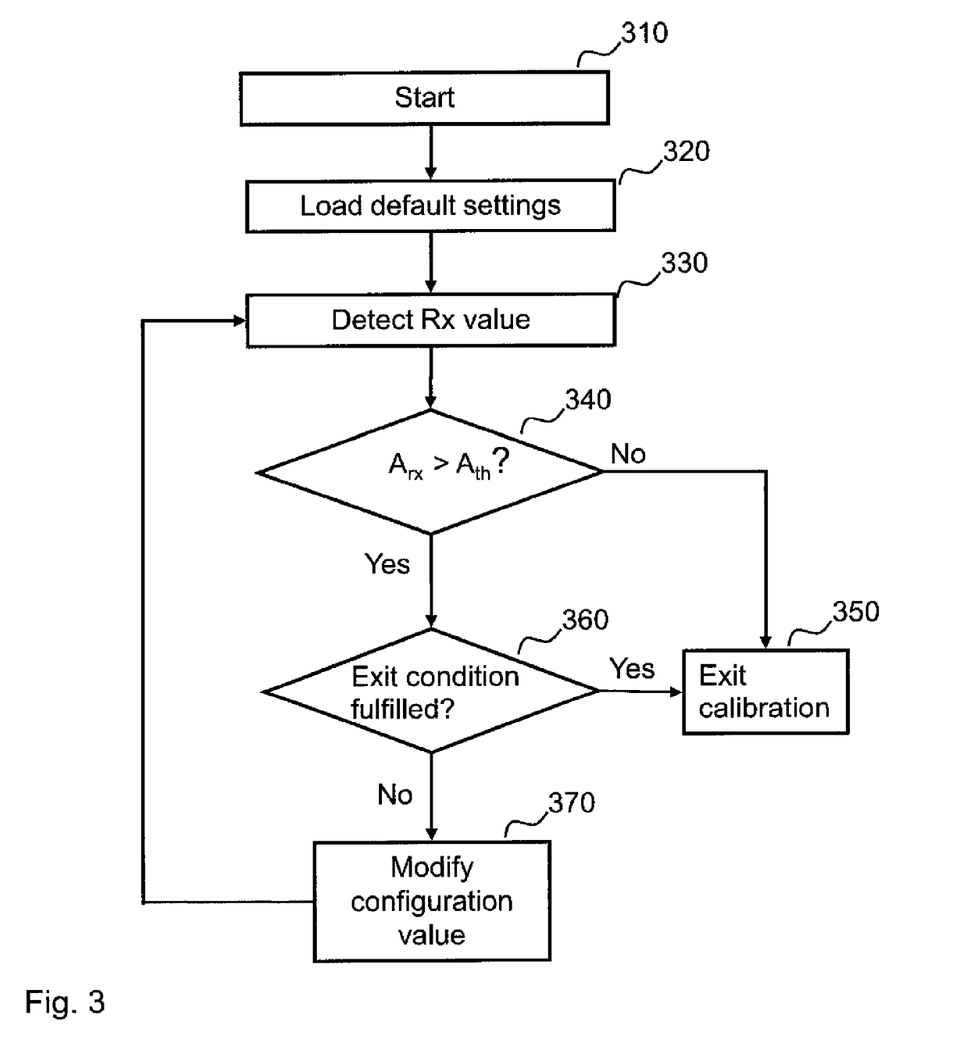
FIG. 3 shows a self-tuning process according to a fourteenth example embodiment of the invention.

FIG. 3 shows a self-tuning process according to a fourteenth example embodiment of the invention. The fourteenth example embodiment may be used in connection with any one or more of the first example embodiment to the thirteenth example embodiment of the invention. In this example embodiment, the transceiver is configured to fine-tune its operational point based on the oscillation level regenerated and detected during the Rx period which is dependent on the performance of the transmitter. More particularly, the baseband part 118 operates as a self-tuning unit that controls the self-tuning. The self-tuning process in FIG. 3 starts in block 310 as response to a given event, such as when the apparatus starts to operate; responsive to receiving a self-tuning command over a radio connection from an external device; and/or responsive to identifying a predetermined level of communication errors on operating the super-regenerative transceiver. Default settings are then loaded 320 and Rx-values are detected 330 immediately after the transmission period with the loaded default settings. During the transmission period, a probe signal with one or more pulses is sent using the current tuning settings. During receiving periods defined by the quench signals, a ringing detection signal is obtained for feedback to control the self-tuning. The amplitude $A_{Rx}$ of measured Rx periods in the ringing detection signal is compared 340 to a predetermined threshold amplitude $A_{th}$. If the measured amplitude does not exceed the threshold $A_{th}$ amplitude, the self-tuning ends and the process continues to step 350 where the super-regenerative transceiver is ready for communications with other devices. On the other hand, if the measured amplitude value $A_{Rx}$ exceeds the threshold $A_{th}$ amplitude, the process advances to block 360 where it is checked whether an exit condition is met. For instance, the checking involves in one example embodiment of the invention determining whether a maximum number of adjustment rounds has been performed or whether a maximum time has been spent for the self-tuning. If yes, the process jumps to step 350, otherwise the tuning of the super-regenerative transceiver is adapted 370. This adapting may involve modifying a configuration value that effects on the tuning of the super-regenerative transceiver. The adapting of the tuning is performed in various ways in different example embodiments of the invention, including one or more of the following alternatives:

adapting impedance matching between super-regenerative transceiver and the antenna;

fine-tuning of center frequency of the super-regenerative transceiver;

adjusting the tuning of the antenna;

adjusting the antenna configuration and/or the bandwidth of the antenna;

adjusting of the amplitude of transmission quench signal currents; and adjusting of transmission quench signal waveforms.

After adapting of the tuning, the process resumes to checking 330.

In the example embodiment of the invention disclosed with reference to step 340, the amplitude $A_{rx}$ of measured Rx periods was compared to a threshold in order to perform self-tuning to a level that satisfies predefined tuning requirements. In a fifteenth example embodiment of the invention, there is an alternative or additional testing in which the lowest amplitude $A_{rx}$ is being searched. This embodiment aims at producing best tuning available by the currently used self-tuning process. Hence, the tuning should be improved regardless whether the predefined tuning requirements can be met. This example embodiment may be used in connection with any one or more of the first to fourteenth example embodiment.

It is appreciated that usually impulse UWB transceivers do not enable Tx/Rx switching during the transmission of a pulse or immediately after that since the Tx and Rx branches are switched to the antenna through a Tx/Rx switch. However, in the super-regenerative transceivers as described in this document, the Rx period may be distinguished from the Tx period by using a simple threshold detector that is not needed during transmission. Hence, no antenna switch is needed. In addition, the quench waveform controlling the oscillation of super-regenerative transceiver is in this example embodiment of the invention different during Tx and Rx periods so that during a Tx period, longer quench periods or higher quench current may be produced for the super-regenerative transceiver. Yet, the effective circuitry used to provide the quench control signal to the super-regenerative transceiver need not be changed in Tx and Rx states.

In a sixteenth example embodiment of the invention, a self-tuning process is performed on two or more different time offsets between the transmission and receiving periods of the super-regenerative transceiver. In this embodiment, it may be tested how short a guard time would suffice to sufficiently avoid tail power or ringing of the antenna after transmission of a pulse during the transmission period. The testing of the necessary guard time in addition to self-tuning with normal guard time may enable classifying or ranking the super-regenerative transceiver according to its properties in one of two or more categories. If such classification is performed in production phase or generally before the super-regenerative transceiver is delivered to its user, the classification can be used to differentiate various super-regenerative transceivers according to their capabilities. This example embodiment may be used in connection with any one or more of the first to fifteenth example embodiment.

The operation a seventeenth example embodiment of the invention is next discussed in the following. This example embodiment may be used in connection with any one or more of the first to sixteenth example embodiment. The Tx and Rx states are active in a common super-regenerative transceiver. The super-regenerative oscillator is activated when the level of quench waveform goes high (that is, when damping factor of the oscillator goes negative, for instance) and the oscillation attenuates to zero after the quench has returned to zero (the damping factor goes back to positive, for instance). The separation of quench waveforms can be modified flexibly in time-domain. This modifying may be performed e.g. using timing registers with a time-domain resolution in the range of 200-500 ps assuming that the timing control is purely based on digital control. Moreover, by controlling actual quench waveforms through a quench register, even better resolution can be achieved. Further still, the accuracy of timing a quench signal can be improved for example by using analogue delay lines that are configured to define the time separation.

The shape of the Tx oscillation can be monitored without external equipment (other than the antenna that may form an integral part of the super-regenerative transceiver) by using the Rx oscillation as the monitoring method. The timing between Tx and Rx quenches may be varied. For instance, a first timing may correspond to a default setting which is the starting point for the calibration. According to the calibration procedure the receiver part (detector 117) may measure resulting oscillation of following Rx period while the timing between Tx and Rx periods is changed. In this process, the first step may be done even without any Tx period to determine and subsequently compensate for floor noise level. The resulting oscillation is then measured with different Tx/Rx separation times. As soon as the Tx oscillation and the sensitivity curve of Rx period start to overlap, the resulting Rx oscillation starts to substantially increase. If the timing separation or guard time between Tx and Rx quenches is not small enough, the Tx parameters can be fine-tuned for example to minimize unwanted ringing of antenna.

It is appreciated that any amplitude measurements may be repeated with many settings and the result may be averaged over large number of samples since the achievable sampling rate is high, easily in the range of millions of samples per second. Moreover, if the testing is performed on production of the super-regenerative transceiver, the results may be stored as calibration values to a non-volatile (e.g. read only memory, ROM) memory for future use. The non-volatile memory may be dedicated for the super-regenerative transceiver or located elsewhere in a host device that comprises the super-regenerative transceiver. Then, after the super-regenerative transceiver is taken into use, the same procedure may be repeated in order to compensate some of the variations caused by changes in operating conditions such as changing temperature or user's fingers resting near the antenna. The calibrating of the super-regenerative transceiver may also compensate for factors such as changing distance to a ground plane in a host device that contains the super-regenerative transceiver.

According to an eighteenth example embodiment of the invention, the Rx oscillation is not used at all to measure the amplitude of Tx oscillation but the peak-detector originally dedicated for reception of incoming pulses is re-used. In this embodiment the detector is capable of covering larger amplitude range since the Tx amplitude is far larger than the amplitude of recovered Rx pulses resulting from non-linearities of the antenna such as ringing. In this embodiment, the Tx amplitude can be directly measured by using a particularly simple detector implementation. This example embodiment may be used in connection with any one or more of the first to thirteenth example embodiment.

It is appreciated that on producing the self-tuning, possible proximately located other super-regenerative transceivers may cause reflections if probing pulses coincide with their transmission periods. In a nineteenth example embodiment of the invention, the transmitter unit 110 is configured to determine a testing period when proximate tags should not substantially interfere with the self-tuning and to produce the self-tuning in such a period. The testing period need not be contiguous, but instead there may be gaps reserved for communications needed by surrounding other transceivers. This example embodiment may be used in connection with any one or more of the first to seventeenth example embodiment.

Various example embodiments of the invention have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

What is claimed is:

1. An apparatus comprising:
a super-regenerative transceiver;
an antenna interface configured to connect the super-regenerative transceiver with an antenna;
a self-tuning unit configured to cause a self-tuning cycle to:
transmit to the antenna a probe signal with one or more pulses;
receive from the antenna a ringing detection signal;
determine if the ringing detection signal reflects tails of the probe signal with amplitude meeting a predetermined detection condition; and
cause an adjustment of the tuning of the super-regenerative transceiver if the amplitude does not meet the predetermined detection condition; and
repeat the self-tuning cycle until the amplitude meets the predetermined detection condition or a predetermined criterion is met.

2. An apparatus according to claim 1, wherein the predetermined criterion is selected from a group consisting of: having performed a predetermined maximum number of self-tuning cycles; having spent a predetermined maximum time to perform self-tuning cycles; and having estimated that further self-tuning cycles would not likely result in the amplitude meeting the predetermined condition.

3. An apparatus according to claim 1, wherein the detection condition refers to not exceeding a predetermined threshold amplitude.

4. An apparatus according to claim 1, wherein the detection condition refers to an amplitude that meets a relative condition.

5. An apparatus according to claim 1, wherein the self-tuning unit is configured to the self-tuning cycles with two or more different time offsets between transmission and reception periods configured by respective quench signals.

6. An apparatus according to claim 1, wherein the adjustment of the tuning of the super-regenerative transceiver comprises adaptment of impedance matching between super-regenerative transceiver and the antenna.

7. An apparatus according to claim 1, wherein the adjustment of the tuning of the super-regenerative transceiver comprises adjustment of fine-tuning of center frequency of the super-regenerative transceiver.

8. An apparatus according to claim 1, wherein the adjustment of the tuning of the super-regenerative transceiver comprises adjustment of the tuning of the antenna.

9. An apparatus according to claim 1, wherein the adjustment of the tuning of the super-regenerative transceiver comprises adjustment of the amplitude of transmission quench signal currents.

10. An apparatus according to claim 1, wherein the adjustment of the tuning of the super-regenerative transceiver comprises adjustment of the shape of transmission quench signal waveforms.

11. An apparatus according to claim 1, further configured to transmit a probe signal and to receive the ringing detection signal such that the transmission and reception of pulses occurs substantially simultaneously.

12. A method in a super-regenerative transceiver, the method comprising:
performing in the super-regenerative transceiver a self-tuning cycle comprising:
transmitting to an antenna a probe signal with one or more pulses;
receiving from the antenna a ringing detection signal;
determining if the ringing detection signal reflects tails of the probe signal with amplitude meeting a predetermined detection condition; and
causing adjusting of the tuning of the super-regenerative transceiver if the amplitude does not meet the predetermined detection condition; and
repeating the self-tuning cycle until the amplitude meets the predetermined detection condition or a predetermined criterion is met.

13. A method according to claim 12, wherein the predetermined criterion is selected from a group consisting of: having performed a predetermined maximum number of self-tuning cycles; having spent a predetermined maximum time to perform self-tuning cycles; and having estimated that further self-tuning cycles would not likely result in the amplitude not exceeding the predetermined threshold amplitude.

14. A method according to claim 12, wherein the determination if the ringing detection signal reflects tails of the probe signal with amplitude meeting the predetermined detection condition comprises averaging measured amplitudes over a number of pulses of the probe signal.

15. A method according to claim 1, wherein the adjusting of the tuning of the super-regenerative transceiver comprises at least one of: adapting impedance matching between super-regenerative transceiver and the antenna, fine-tuning of center frequency of the super-regenerative transceiver, adjusting the tuning of the antenna, adjusting the amplitude of transmission quench signal currents, and adjusting the shape of transmission quench signal waveforms.

16. A computer program product configured to control a super-regenerative transceiver, the computer program product comprising a computer executable program code recorded on a non-transitory computer readable storage medium configured to cause the super-regenerative transceiver, when executed, to:
perform in the super-regenerative transceiver a self-tuning cycle comprising:
transmitting to an antenna a probe signal with one or more pulses;
receiving from the antenna a ringing detection signal;
determining if the ringing detection signal reflects tails of the probe signal with amplitude meeting a predetermined detection condition;
causing adjusting of the tuning of the super-regenerative transceiver if the amplitude does not meet the predetermined detection condition; and
repeat the self-tuning cycle until the amplitude meets the predetermined detection condition or a predetermined criterion is met.

17. A computer program product according to claim 16, wherein the predetermined criterion is selected from a group consisting of: having performed a predetermined maximum number of self-tuning cycles; having spent a predetermined maximum time to perform self-tuning cycles; and having estimated that further self-tuning cycles would not likely result in the amplitude not exceeding the predetermined threshold amplitude.

18. A computer program product according to claim 16, wherein the computer executable code configured to cause the super-regenerative transceiver to perform determination if the ringing detection signal reflects tails of the probe signal with amplitude meeting the predetermined detection condition comprises averaging measured amplitudes over a number of pulses of the probe signal.

19. A computer program product according to claim 16, wherein the computer executable code configured to cause the super-regenerative transceiver to perform adjusting of the tuning of the super-regenerative transceiver comprises at least one of: adapting impedance matching between super-regenerative transceiver and the antenna, fine-tuning of center frequency of the super-regenerative transceiver, adjusting the tuning of the antenna, adjusting the amplitude of transmission quench signal currents, and adjusting the shape of transmission quench signal waveforms.

* * * * *